US012278335B2

(12) United States Patent
Park et al.

(10) Patent No.: US 12,278,335 B2
(45) Date of Patent: Apr. 15, 2025

(54) POLYMER ELECTROLYTE FOR SECONDARY BATTERY AND LITHIUM SECONDARY BATTERY INCLUDING THE SAME

(71) Applicant: LG Chem, Ltd., Seoul (KR)

(72) Inventors: Sol Ji Park, Daejeon (KR); Kyoung Ho Ahn, Daejeon (KR); Chul Haeng Lee, Daejeon (KR); Jun Hyeok Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 522 days.

(21) Appl. No.: 16/610,592

(22) PCT Filed: Jul. 26, 2018

(86) PCT No.: PCT/KR2018/008450
§ 371 (c)(1),
(2) Date: Nov. 4, 2019

(87) PCT Pub. No.: WO2019/022522
PCT Pub. Date: Jan. 31, 2019

(65) Prior Publication Data
US 2020/0203762 A1    Jun. 25, 2020

(30) Foreign Application Priority Data

Jul. 26, 2017 (KR) .................. 10-2017-0094959
Jul. 25, 2018 (KR) .................. 10-2018-0086713

(51) Int. Cl.
*H01M 10/0565* (2010.01)
*C08J 5/18* (2006.01)
*C08L 69/00* (2006.01)
*H01M 10/0525* (2010.01)
*H01M 50/491* (2021.01)
*H01M 50/494* (2021.01)
*H01M 50/497* (2021.01)

(52) U.S. Cl.
CPC .......... *H01M 10/0565* (2013.01); *C08J 5/18* (2013.01); *C08L 69/00* (2013.01); *H01M 10/0525* (2013.01); *H01M 50/491* (2021.01); *H01M 50/494* (2021.01); *H01M 50/497* (2021.01); *C08J 2369/00* (2013.01); *H01M 2300/0065* (2013.01); *H01M 2300/0082* (2013.01); *H01M 2300/0091* (2013.01)

(58) Field of Classification Search
CPC ..... H01M 10/0565; H01M 2300/0082; H01M 10/0525; C08J 2369/00; C08L 69/00
See application file for complete search history.

(56) References Cited

U.S. PATENT DOCUMENTS

| | | | |
|---|---|---|---|
| 3,992,203 A * | 11/1976 | Horhold | G03G 5/07 430/70 |
| 6,413,676 B1 | 7/2002 | Munshi | |
| 6,548,590 B1 * | 4/2003 | Koloski | C08K 9/08 524/84 |
| 6,645,675 B1 | 11/2003 | Munshi | |
| 2003/0054257 A1 | 3/2003 | Noda et al. | |
| 2004/0122178 A1 * | 6/2004 | Huang | H01M 10/0565 429/313 |
| 2004/0224233 A1 | 11/2004 | Chen et al. | |
| 2005/0095504 A1 * | 5/2005 | Kim | H01M 50/46 429/246 |
| 2006/0035137 A1 | 2/2006 | Maruo et al. | |
| 2008/0142753 A1 * | 6/2008 | Boon | H01B 1/122 252/62.2 |
| 2012/0242292 A1 * | 9/2012 | Ogino | H01M 10/0562 320/167 |
| 2013/0108930 A1 * | 5/2013 | Patterson | H01M 10/4235 429/231.8 |
| 2015/0010816 A1 * | 1/2015 | Chung | H01M 4/587 525/296 |
| 2017/0309956 A1 | 10/2017 | Park et al. | |
| 2018/0034058 A1 * | 2/2018 | Suh | H01M 4/587 |
| 2018/0179386 A1 * | 6/2018 | Calderón | A61K 31/513 |
| 2018/0219255 A1 * | 8/2018 | Morioka | C08K 5/435 |
| 2018/0248189 A1 * | 8/2018 | Pan | H01M 10/0525 |
| 2019/0348672 A1 * | 11/2019 | Wang | H01M 4/405 |

FOREIGN PATENT DOCUMENTS

| | | | |
|---|---|---|---|
| CN | 100572429 C | * | 12/2009 |
| CN | 102522589 A | | 6/2012 |
| CN | 105098233 A | | 11/2015 |
| CN | 106058311 A | | 10/2016 |
| CN | 106797053 A | | 5/2017 |
| JP | 2000082330 A | | 3/2000 |

(Continued)

OTHER PUBLICATIONS

Hou (Hou et al.; Polymer 2001, vol. 42, p. 4181) (Year: 2001).*
Wikipedia: Poly(p-phenylene vinylene) (Wikipedia's poly(p-phenylene vinylene page as published on May 5, 2016, "https://en.wikipedia.org/w/index.php?title=Poly(p-phenylene_vinylene)&oldid=718713572" (Year: 2016).*
Extended European Search Report for Application No. EP18839191 dated Jan. 29, 2020.
Kento Kimura et al: "Correlation between Solvation Structure and Ion-Conductive Behavior Concentrated Poly (ethylene carbonate)-Based Electrolytes", Journal of Physical Chemistry C, vol. 120, No. 23, Jun. 16, 2016, pp. 12385-12391, XP055659629.

(Continued)

*Primary Examiner* — Jeremiah R Smith
(74) *Attorney, Agent, or Firm* — Lerner David LLP

(57) ABSTRACT

The present invention relates to a polymer electrolyte for a secondary battery and a lithium secondary battery including the same, and to a polymer electrolyte for a secondary battery, which includes a first polymer including a repeating unit represented by Formula 1, and a second polymer including a repeating unit derived from a monomer having at least one ethylenically unsaturated group or an oligomer thereof, and a lithium secondary battery including the same.

13 Claims, No Drawings

(56) References Cited

FOREIGN PATENT DOCUMENTS

| | | | |
|---|---|---|---|
| JP | 3384173 | B2 | 3/2003 |
| JP | 3603383 | B2 | 12/2004 |
| JP | 3614658 | B2 | 1/2005 |
| JP | 200544704 | A | 2/2005 |
| JP | 4416200 | B2 | 2/2010 |
| KR | 20120121141 | A | 11/2012 |
| KR | 101351846 | B1 | 1/2014 |
| KR | 20150056122 | A | 5/2015 |
| KR | 20170050278 | A | 5/2017 |
| KR | 20170050561 | A | 5/2017 |

OTHER PUBLICATIONS

Barbosa et al., "Interpenetrating Networks Based on Poly(trimethylene Carbonate) and Poly(ethylene oxide) Blends Doped With Lithium Salts", ECS Transactions, vol. 16, No. 29, Nov. 2009, pp. 157-165.

Barbosa et al., "Solid-state electrochromic devices using pTMC/PEO blends as polymer electrolytes," Electrochimica Acta, vol. 55, Issue 4, Jan. 2010, pp. 1495-1502.

Huang et al., "Fabrication and properties of polybutadiene rubber-interpenetrating cross-linking poly(propylene carbonate) network as gel polymer electrolytes for lithium-ion battery", The Royal Society of Chemistry, RSC Advances, vol. 5, Jun. 2015, pp. 52978-52984.

Huang et al., "High-Performance Electrospun Poly(vinylidene fluoride)/Poly(propylene carbonate) Gel Polymer Electrolyte for Lithium-Ion Batteries", The Journal of Physical Chemistry, vol. 119, Nov. 2015, pp. 27882-27891.

International Search Report from Application No. PCT/KR2018/008450 mailed Oct. 30, 2018, 2 pages.

Rodrigues et al., "Synthesis and characterization of amorphous poly(ethylene oxide)/poly(trimethylene carbonate) polymer blend electrolytes", Electrochimica Acta, vol. 86, Mar. 2012, pp. 339-345.

Zhang et al., "Safety-Reinforced Poly(Propylene Carbonate)-Based All-Solid-State Polymer Electrolyte for Ambient-Temperature Solid Polymer Lithium Batteries", Advanced Energy Materials, vol. 5, Oct. 2015, pp. 1501082 (10 pages).

Kwon, S. et al., "Preparation of organic/inorganic hybrid semi-interpenetrating network polymer electrolytes based on poly(ethylene oxide-co-ethylene carbonate) for all-solid-state lithium batteries at elevated temperatures", Polymer, Apr. 2014, pp. 2799-2808 (1-10), vol. 55.

Search Report dated Mar. 18, 2022 from the Office Action for Chinese Application No. 201880026669.4 issued Mar. 28, 2022, 7 pages.

* cited by examiner

POLYMER ELECTROLYTE FOR SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/008450, filed on Jul. 26, 2018, which claims priority from Korean Patent Application Nos. 10-2017-0094959, filed on Jul. 26, 2017, and 10-2018-0086713, filed on Jul. 25, 2018, the disclosures of which are incorporated herein by reference.

TECHNICAL FIELD

The present invention relates to a polymer electrolyte for a secondary battery and a lithium secondary battery including the same.

BACKGROUND ART

There is a growing demand for high performance, high stability secondary batteries as electric, electronic, communication, and computer industries have rapidly developed. Particularly, in line with miniaturization and lightweight trends of electronic (communication) devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

With respect to the lithium ion battery, it may have high capacity, but, since the liquid electrolyte containing a lithium salt is used, there may be a risk of leakage and explosion and battery design may be complicated to prepare for the risk.

In contrast, with respect to the lithium polymer battery, since a solid polymer electrolyte or a gel polymer electrolyte is used as the electrolyte, stability is improved and, simultaneously, flexibility is obtained, and thus, the lithium polymer battery may be developed in various forms, for example, in the form of small or thin-film batteries.

However, since the solid or gel polymer electrolyte has lower ionic conductivity than the liquid electrolyte, the solid or gel polymer electrolyte may not yet be suitable for commercialization.

For example, with respect to polyethylene oxide which has been widely used as the polymer electrolyte, since cations of alkali metal salt are stabilized while the cations are coordinated with oxygen atoms present in the polyethylene oxide to form a complex, the cations may be present in a stable ionic state despite the fact that it is in a solid state without a solvent. However, since the polyethylene oxide has a semi-crystalline structure at room temperature, it interferes with the movement of the metal salt. As a result, since energy characteristics are not only degraded while having a low ionic conductivity value of about $1.0 \times 10^{-8}$ S/cm at room temperature but mechanical properties are also deteriorated, it may not be suitable for commercialization.

Thus, there is an urgent need to develop a solid polymer electrolyte having excellent mechanical strength and high ionic conductivity as well as good processability while maintaining a solid phase.

Prior Art Document

Japanese Patent Application Laid-open Publication No. 2005-044704

DISCLOSURE OF THE INVENTION

Technical Problem

An aspect of the present invention provides a polymer electrolyte for a secondary battery in which mechanical strength is secured and ion transfer capability is improved at the same time.

Another aspect of the present invention provides a composition for a polymer electrolyte for forming the polymer electrolyte for a secondary battery.

Another aspect of the present invention provides a method of preparing a secondary battery in which the polymer electrolyte for a secondary battery is used.

Another aspect of the present invention provides a lithium secondary battery having improved electrochemical stability at high voltage and high temperature which is prepared by the above method.

Technical Solution

According to an aspect of the present invention, there is provided a polymer electrolyte for a secondary battery including:

a first polymer including a repeating unit represented by Formula 1; and a second polymer including a repeating unit derived from a monomer having at least one ethylenically unsaturated group or an oligomer thereof, wherein the first polymer and the second polymer form a semi-interpenetrating polymer network (semi-IPN) structure.

[Formula 1]

$$\left[ R_1 \diagup O \diagdown \underset{O}{\overset{O}{\|}}{C} \diagup O \right]_n$$

In Formula 1, $R_1$ is an alkylene group having 1 to 5 carbon atoms, and n is an integer of 10 to 10,000.

The first polymer may include at least one selected from the group consisting of repeating units represented by Formulae 1a to 1c.

[Formula 1a]

$$\left[ \underset{}{\overset{}{\diagup}} O \diagdown \underset{O}{\overset{O}{\|}}{C} \diagup O \right]_{n_1}$$

In Formula 1a,
$n_1$ is an integer of 10 to 10,000.

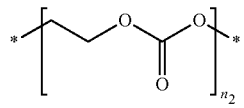
[Formula 1b]

In Formula 1b,
$n_2$ is an integer of 10 to 10,000.

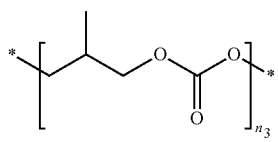
[Formula 1c]

In Formula 1c,
$n_3$ is an integer of 10 to 10,000.

Also, the second polymer may include at least one selected from the group consisting of polyacetylene, polyethylene, polypropylene, polystyrene, poly(p-phenylene), polythiophene, polypyrrole, poly(p-phenylene sulfide), poly(p-phenylene vinylene), poly(thienylene vinylene), polyaniline, polyisothionaphthalene, polytetrafluoroethylene, poly(vinyl chloride), polyacrylonitrile, poly(vinyl acetate), poly(vinylidene chloride), poly(methyl methacrylate), polyethylene terephthalate, polybutylene terephthalate, polyethylene oxide, polyphenylene oxide, polyethersulfone, polyarylate, poly(ether ether ketone), polyamideimide, and polyvinylene fluoride.

The second polymer may be included in an amount of 1 part by weight to 100 parts by weight based on 100 parts by weight of the first polymer.

Furthermore, the polymer electrolyte may include a lithium salt, and the lithium salt may be included in a concentration of 0.5 M to 5 M in the polymer electrolyte for a secondary battery.

The polymer electrolyte of the present invention may be a free-standing solid polymer electrolyte.

According to another aspect of the present invention, there is provided a composition for the polymer electrolyte of the present invention which includes:
  a first polymer including a repeating unit represented by Formula 1;
  a monomer having at least one ethylenically unsaturated group or an oligomer thereof;
  an organic solvent in which a lithium salt is dissolved; and
  a polymerization initiator.

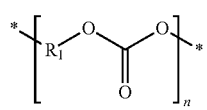
[Formula 1]

In Formula 1,
$R_1$ is an alkylene group having 1 to 5 carbon atoms, and n is an integer of 10 to 10,000.
The monomer having an ethylenically unsaturated group may include at least one compound selected from the group consisting of acetylene, ethylene, propylene, styrene, p-phenylene, thiophene, pyrrole, p-phenylene sulfide, p-phenylene vinylene, thienylene vinylene, aniline, isothianaphthalene, tetrafluoroethylene, vinyl chloride, acrylonitrile, vinyl acetate, vinylidene chloride, methyl methacrylate, ethylene terephthalate, butylene terephthalate, ethylene oxide, phenylene oxide, ether sulfone, arylate, ether ether ketone, amideimide, and vinylene fluoride.

The first polymer including a repeating unit represented by Formula 1 may be included in an amount of 50 wt % to 95 wt % based on a total weight of reactants in the composition for the polymer electrolyte.

Also, the monomer having an ethylenically unsaturated group or the oligomer thereof may be included in an amount of 1 part by weight to 100 parts by weight based on 100 parts by weight of the first polymer including a repeating unit represented by Formula 1.

Furthermore, the composition for the polymer electrolyte may further include an oxygen inhibitor, and the oxygen inhibitor may be included in an amount of 0.1 wt % to 10 wt % based on a total weight of the composition for the polymer electrolyte.

According to another aspect of the present invention, there is provided a method of preparing a secondary battery which includes:
  coating the composition for the polymer electrolyte of the present invention on at least one surface of the prepared negative electrode, positive electrode, and separator; and forming a polymer electrolyte film by drying the composition for the polymer electrolyte.

According to another aspect of the present invention, there is provided a method of preparing a secondary battery which includes:
  coating the composition for the polymer electrolyte of the present invention on a base; forming a polymer electrolyte film by drying the composition for the polymer electrolyte; separating the polymer electrolyte film from the base; and disposing the separated polymer electrolyte film on at least one surface of the prepared negative electrode, positive electrode, and separator.

According to another aspect of the present invention, there is provided a lithium secondary battery including:
  a positive electrode, a negative electrode, and a polymer electrolyte formed on at least one surface of the positive electrode and the negative electrode, wherein the polymer electrolyte includes the polymer electrolyte for a secondary battery of the present invention.

Advantageous Effects

The present invention may prepare a polymer electrolyte for a secondary battery, which may secure excellent mechanical strength and may maintain ion transfer capability inherent in a poly(alkylene carbonate) derived polymer at the same time, by including a first polymer including a repeating unit represented by Formula 1; and a second polymer including a repeating unit derived from a monomer having at least one ethylenically unsaturated group. Also, a lithium secondary battery having improved electrochemical stability at high voltage and high temperature may be prepared by including the polymer electrolyte for a secondary battery.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Unless otherwise specified in the present invention, the expression "*" denotes the same or different atom or a portion connected between ends of a formula.

In the specification of the present invention, a weight-average molecular weight (Mw) may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated using an analytical method (system: Alliance 4, column: Ultrahydrogel linear X2, eluent: 0.1M $NaNO_3$ (pH 7.0 phosphate buffer, flow rate: 0.1 mL/min, temp: 40° C., injection: 100 μL)).

Also, in the specification of the present invention, ionic conductivity may be measured by an alternating current impedance method. The ionic conductivity may be measured in a frequency range of 0.01 Hz to 1 MHz using a VMP3 measurement instrument and 4294A.

Furthermore, in the specification of the present invention, electrochemical (oxidation) stability of a secondary battery was measured at 60° C. using linear sweep voltammetry (LSV) with a potentiostat (EG&G, model 270A).

In the specification of the present invention, tensile strength was measure for electrolyte specimens, which were prepared according to ASTM standard D638 (Type V specimens), at a rate of 5 mm per minute at 25° C. and a relative humidity of about 30% using Lloyd LR-10K.

Electrolytes currently used in a lithium polymer secondary battery may be divided into a gel polymer electrolyte or a solid polymer electrolyte.

The gel polymer electrolyte is disadvantageous in that mechanical strength is reduced or it is difficult to control a film thickness when the amount of a plasticizer is increased to achieve high ionic conductivity. In contrast, since there is no solution leakage in a secondary battery including the solid polymer electrolyte in comparison to a secondary battery using a liquid electrolyte solution as an ion transport medium, reliability and stability of the battery may be improved and, simultaneously, thinness, simplification of package, and weight reduction may be achieved. Also, since the solid polymer electrolyte has inherently good processability, it is advantageous in that the formation of a laminated structure with an electrode is easy and a change in shape of a solid electrolyte interface due to a change in volume of the electrode caused by intercalation and deintercalation of ions is possible when the solid polymer electrolyte is used in an electrochemical device such as a battery.

However, since the solid polymer electrolyte has relatively lower ionic conductivity than the gel polymer electrolyte, it is disadvantageous in that battery resistance is increased due to low charge/discharge current density of the secondary battery using the solid polymer electrolyte at room temperature.

Thus, the present invention aims at providing a polymer electrolyte, specifically, a solid polymer electrolyte having secured mechanical strength as well as high ionic conductivity due to excellent ion transfer capability and a secondary battery including the same.

Specifically, in an embodiment of the present invention, provided is a polymer electrolyte for a secondary battery which includes:

a first polymer including a repeating unit represented by Formula 1 below; and a second polymer including a repeating unit derived from a monomer having at least one ethylenically unsaturated group or an oligomer thereof, wherein the first polymer and the second polymer form a structure similar to a semi-interpenetrating polymer network (semi-IPN) structure.

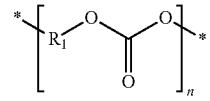

[Formula 1]

In Formula 1, $R_1$ is an alkylene group having 1 to 5 carbon atoms, and n is an integer of 10 to 10,000, preferably 50 to 7,000, and more preferably 50 to 5,000.

Specifically, the first polymer may include at least one selected from the group consisting of repeating units represented by the following Formulae 1a to 1c.

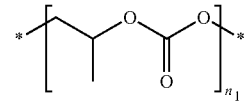

[Formula 1a]

In Formula 1a, $n_1$ is an integer of 10 to 10,000, preferably 50 to 7,000, and more preferably 50 to 5,000.

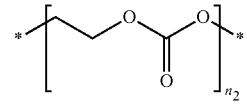

[Formula 1b]

In Formula 1b, $n_2$ is an integer of 10 to 10,000, preferably 50 to 7,000, and more preferably 50 to 5,000.

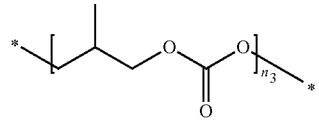

[Formula 1c]

In Formula 1c, $n_3$ is an integer of 10 to 10,000, preferably 50 to 7,000, and more preferably 50 to 5,000.

The first polymer may have a weight-average molecular weight (Mw) of 1,000 g/mol to 1,000,000 g/mol, particularly 5,000 g/mol to 700,000 g/mol, and more particularly 5,000 g/mol to 500,000 g/mol, and, in a case in which the weight-average molecular weight of the first polymer is within the above range, mechanical properties and electrochemical stability of the polymer electrolyte may be secured and ion transfer capability of the polymer electrolyte may be improved at the same time.

The weight-average molecular weight (Mw) of the first polymer may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated using an analytical method (system: Alliance 4, column: Ultrahydrogel linear X2, eluent: 0.1M $NaNO_3$ (pH 7.0 phosphate buffer, flow rate: 0.1 mL/min, temp: 40° C., injection: 100 μL)).

Also, the second polymer may include at least one selected from the group consisting of polyacetylene, polyethylene, polypropylene, polystyrene, poly(p-phenylene), polythiophene, polypyrrole, poly(p-phenylene sulfide), poly (p-phenylene vinylene), poly(thienylene vinylene), polyaniline, polyisothionaphthalene, polytetrafluoroethylene, poly (vinyl chloride), polyacrylonitrile, poly(vinyl acetate), poly (vinylidene chloride), poly(methyl methacrylate), polyethylene terephthalate, polybutylene terephthalate, polyethylene oxide, polyphenylene oxide, polyethersulfone, polyarylate, poly(ether ether ketone), polyamideimide, and polyvinylene fluoride.

Specifically, the second polymer may include at least one selected from the group consisting of polyacetylene, polystyrene, poly(p-phenylene), polythiophene, polypyrrole, poly (p-phenylene sulfide), poly(p-phenylene vinylene), poly(thienylene vinylene), polyaniline, polyisothionaphthalene, polytetrafluoroethylene, poly(vinyl chloride), polyacrylonitrile, poly(vinyl acetate), poly(vinylidene chloride), poly(methyl methacrylate), polyethylene terephthalate, polybutylene terephthalate, polyethersulfone, polyarylate, poly(ether ether ketone), polyamideimide, and polyvinylene fluoride.

The second polymer may have a weight-average molecular weight (Mw) of 1,000,000 g/mol or less, particularly 1,000 g/mol to 1,000,000 g/mol, and more particularly 1,000 g/mol to 700,000 g/mol, for example, 1,000 g/mol to 500,000 g/mol, and, in a case in which the weight-average molecular weight of the second polymer is within the above range, since an oxidation potential window of the polymer electrolyte may be increased and mechanical properties may be secured at the same time, stability under high voltage may be increased and the occurrence of a short by polymer melting at a high temperature may be suppressed. Thus, physical and electrochemical stability of a lithium secondary battery including the polymer electrolyte may be improved.

The weight-average molecular weight (Mw) of the second polymer may be measured using the gel permeation chromatography (GPC) as described above.

In the polymer electrolyte for a secondary battery, the second polymer may be included in an amount of 1 part by weight to 100 parts by weight, particularly 5 parts by weight to 90 parts by weight, and more particularly 10 parts by weight to 30 parts by weight based on 100 parts by weight of the first polymer.

In a case in which the first polymer and the second polymer are included in the above ratio, since the mechanical strength may be secured and the oxidation potential window and ion transfer capability may be improved at the same time, the electrochemical stability of the secondary battery may be improved. Specifically, since the first polymer has better ion transfer capability than the second polymer, degradation of the Li ion transfer capability due to the network structure of the second polymer may be prevented and oxidation potential may be improved when the first polymer is included in an amount equal to or greater than that of the second polymer. Also, since the mechanical strength may be secured when the second polymer is included in an amount of 1 part by weight or more based on the first polymer, cell operation at high voltage and high temperature may be possible.

That is, in the polymer electrolyte of the present invention, since a polymer matrix structure composed of the first polymer and having excellent ion transfer characteristics and a polymer matrix structure composed of the second polymer, which is formed by cross-linking polymerization of the monomers having an ethylenically unsaturated group or the oligomers thereof, are intermingled, the mechanical strength and the oxidation potential window may be further improved.

Also, the polymer electrolyte of the present invention may improve lithium ion transfer characteristics by including a lithium salt.

The lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $B(C_2O_4)_2^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. The lithium salt may be used alone or may be used in a mixture of two or more thereof, if necessary. The lithium salt may be appropriately changed in a normally usable range, but may be included in a concentration of 0.5 M to 5 M, for example, 0.5 M to 3 M in the polymer electrolyte in order to obtain an optimum corrosion protection film formation effect on the surface of an electrode.

The polymer electrolyte of the present invention may be a free-standing solid polymer electrolyte which is formed by mixing the first polymer, the second polymer, and selectively, the lithium salt.

The solid polymer electrolyte may have an ionic conductivity of $3.0 \times 10^{-5}$ S/cm to $3.0 \times 10^{-4}$ S/cm, for example, $3.0 \times 10^{-5}$ S/cm to $2.5 \times 10^{-4}$ S/cm.

The ionic conductivity may be measured by an alternating current impedance method. The ionic conductivity may be measured in a frequency range of 0.01 Hz to 1 MHz using a VMP3 measurement instrument and 4294A.

Also, in an embodiment of the present invention,
in order to form the polymer electrolyte for a secondary battery of the present invention, provided is a composition for the polymer electrolyte of the present invention which includes:
a first polymer including a repeating unit represented by Formula 1 below;
a monomer having at least one ethylenically unsaturated group or an oligomer thereof;
an organic solvent in which a lithium salt is dissolved; and
a polymerization initiator.

[Formula 1]

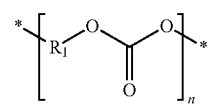

In Formula 1,

R₁ is an alkylene group having 1 to 5 carbon atoms, and n is an integer of 10 to 10,000, preferably 50 to 7,000, and more preferably 50 to 5,000.

In the composition for the polymer electrolyte according to the embodiment of the present invention, the first polymer including a repeating unit represented by Formula 1 may be included in an amount of 50 wt % to 95 wt %, for example, 70 wt % to 92 wt % based on a total weight of reactants including the first polymer, the monomer having an ethylenically unsaturated group, and the polymerization initiator in the composition for the polymer electrolyte. When the amount of the first polymer is 50 wt % or more, a polymer matrix may not only be more easily formed, but a polymer electrolyte having better mechanical strength and ion transfer characteristics may also be achieved. Also, when the amount of the first polymer is 95 wt % or less, since a reduction in ion transfer effect due to the excessive amount of the polymer may be prevented, degradation of battery performance at high temperature and high voltage may be prevented.

Also, in the composition for the polymer electrolyte according to the embodiment of the present invention, the monomer having an ethylenically unsaturated group is a polymerizable compound, wherein, as a representative example, the monomer having an ethylenically unsaturated group may include at least one compound selected from the group consisting of acetylene, ethylene, propylene, styrene, p-phenylene, thiophene, pyrrole, p-phenylene sulfide, p-phenylene vinylene, thienylene vinylene, aniline, isothianaphthalene, tetrafluoroethylene, vinyl chloride, acrylonitrile, vinyl acetate (VAc), vinylidene chloride, methyl methacrylate (MMA), ethylene terephthalate, butylene terephthalate, ethylene oxide, phenylene oxide, ether sulfone, arylate, ether ether ketone, amideimide, and vinylene fluoride.

Furthermore, the oligomer composed of the monomer having an ethylenically unsaturated group may be an oligomer having a weight-average molecular weight (Mw) of 100 g/mol to 5,000 g/mol, for example, 200 g/mol to 1,000 g/mol.

In the composition for the polymer electrolyte of the present invention, in a case in which the oligomer thereof is used instead of the monomer having an ethylenically unsaturated group, the oxidation stability and mechanical strength may be further improved by a more rigid crosslinking structure while the ionic conductivity is not significantly reduced.

A weight-average molecular weight (Mw) of the oligomer may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated using an analytical method (system: Alliance 4, column: Ultrahydrogel linear X2, eluent: 0.1M NaNO₃ (pH 7.0 phosphate buffer, flow rate: 0.1 mL/min, temp: 40° C., injection: 100 µL)).

Also, in the composition for the polymer electrolyte, the monomer having an ethylenically unsaturated group or the oligomer thereof may be included in an amount of 1 part by weight to 100 parts by weight, particularly 5 parts by weight to 90 parts by weight, and more particularly 10 parts by weight to 30 parts by weight based on 100 parts by weight of the first polymer.

In a case in which the first polymer and the monomer having at least one ethylenically unsaturated group or the oligomer thereof are included in the above content ratio, the mechanical strength may be secured and the ion transfer capability may be improved at the same time.

Until now, with respect to a typical solid polymer electrolyte, it has not been easy to secure the mechanical strength and the ion transfer capability at the same time. In contrast, in the present invention, in a case in which the composition for the polymer electrolyte, which includes both the first polymer including the repeating unit represented by Formula 1 and the monomer having at least one ethylenically unsaturated group or the oligomer thereof, is provided to prepare a solid polymer electrolyte, a structure similar to the semi-interpenetrating polymer network (semi-IPN) structure, in which the second polymer including the crosslinking structure obtained by the cross-linking polymerization of the monomers having an ethylenically unsaturated group or the oligomers thereof and the first polymer are intermingled, is formed. That is, since the first polymer and the second polymer present in the polymer electrolyte do not form a three-dimensional network by chemical bonding, that is, the first polymer and the second polymer are not cross-linked, but the second polymer forms an auxiliary polymer network structure between free volumes of the polymer matrix composed of the first polymer, weak durability of the polymer matrix composed of the first polymer may be compensated.

Thus, a solid polymer electrolyte, which may secure excellent mechanical strength and oxidation potential window and may simultaneously secure a movement effect of lithium ions by providing free lithium ions (Li⁺), may be prepared. Particularly, with respect to the solid polymer electrolyte, operation of the battery in the form of an all solid-ion battery may be possible.

In contrast, in a case in which a polymer compound, such as polyethylene glycol, instead of the monomer having an ethylenically unsaturated group, is mixed with the first polymer including the repeating unit represented by Formula 1, since a layer in the form, in which the first polymer and the polyethylene glycol are simply mixed, is formed, an effect of improving the mechanical properties or oxidation stability may not be expected in comparison to a polymer electrolyte formed by the first polymer alone and durability may be reduced.

Also, in the composition for the polymer electrolyte according to the embodiment of the present invention, the organic solvent, in which the lithium salt is dissolved, is not limited as long as it may minimize decomposition due to an oxidation reaction during charge and discharge of the secondary battery and may exhibit desired characteristics with an additive. For example, a volatile organic solvent having a low boiling point or a nonvolatile organic solvent may all be used, and typical examples of the organic solvent may be at least one selected from the group consisting of N,N'-dimethylacetamide, N-methyl-2-pyrrolidone (hereinafter, abbreviated as "NMP"), dimethylsulfoxide (DMSO), N,N-dimethylformamide (DMF), acetonitrile (AN), propylene carbonate (PC), ethylene carbonate (EC), butylene carbonate (BC), dimethyl carbonate (DMC), diethyl carbonate (DEC), ethylmethyl carbonate (EMC), fluoroethylene carbonate (FEC), γ-butyrolactone (GBL), 1,2-dimethoxy ethane, tetrahydroxyfuran, 2-methyl tetrahydrofuran (THF), 1,3-dioxolane (DOL), 1,4-dioxane, formamide, dioxolane, nitromethane, methyl formate, ethyl acetate (EA), ethyl propionate (EP), methyl acetate (MA), methyl propionate (MP), dimethoxyethane (DME), phosphate triester, diethyl ether, trimethoxy methane, triglyme, tetraglyme (TEGDME), sulfolane, methyl sulfolane, and 1,3-dimethyl-2-imidazolidinone, or a mixture of two or more thereof.

Specifically, in order to facilitate the removal of the organic solvent, it is desirable that the organic solvent includes an organic solvent having a low boiling point, such as acetonitrile, or a highly volatile organic solvent such as N-methyl-2-pyrrolidone.

Furthermore, in a case in which the polymer electrolyte of the present invention is desired to be prepared in the form of a solid-liquid hybrid polymer electrolyte, a non-volatile organic solvent, such as tetraglyme, may be used so that the organic solvent well swells the polymer electrolyte to be able to maintain the solid-liquid hybrid polymer electrolyte form.

An amount of the organic solvent used is not particularly limited as long as the organic solvent is used in an amount such that the first polymer and the monomer having an ethylenically unsaturated group are easily dissolved, but the organic solvent may be used in an amount of about 100 parts by weight to about 10,000 parts by weight, for example, 1,000 parts by weight to 5,000 parts by weight, based on 100 parts by weight of a total solid content including the first polymer and the monomer having an ethylenically unsaturated group so that uniformity of a film may be secured during molding of the polymer electrolyte and a thickness of the thin film may be sufficiently secured at the same time.

In a case in which the amount of the organic solvent used is in a range of 100 parts by weight to 10,000 parts by weight, since the organic solvent may be easily removed, a reduction in the mechanical strength of the polymer electrolyte due to the residual organic solvent may be prevented and the composition for the polymer electrolyte may be uniformly coated, the uniformity of the film may be secured during the molding of the polymer electrolyte.

In the present invention, a polymer electrolyte, in which the polymer matrix structure composed of the second polymer, which is formed by the cross-linking polymerization of the monomers having an ethylenically unsaturated group, between the polymer matrices composed of the first polymer is formed, may be prepared by polymerization using a conventionally known polymerization initiator.

The polymerization initiator is a conventional polymerization initiator known in the art, wherein, specifically, at least one selected from the group consisting of an ultraviolet (UV) polymerization initiator, a photopolymerization initiator, and a thermal polymerization initiator may be used.

Specifically, as a representative example, the UV polymerization initiator may include at least one selected from the group consisting of 2-hydroxy-2-methylpropiophenone, 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2-phenyl-acetoxy-ethoxy]-ethyl ester, oxy-phenyl-acetic 2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphosphine oxide, bis(eta 5-2,4-cyclopentadiene-1-yl), bis[2,6-difluoro-3-(1H-pyrrol-1-yl) phenyl]titanium, 4-isobutylphenyl-4'-methylphenyl iodonium, hexafluorophosphate, and methyl benzoylformate.

Also, as a representative example, the photopolymerization initiator or the thermal polymerization initiator may include at least one selected from the group consisting of benzoyl peroxide, acetyl peroxide, dilauryl peroxide, di-tert-butyl peroxide, t-butyl peroxy-2-ethyl-hexanoate, cumyl hydroperoxide, hydrogen peroxide, 2,2'-azobis(2-cyanobutane), 2,2'-azobis(methylbutyronitrile), 2,2'-azobis(iso-butyronitrile) (AIBN), and 2,2'-azobisdimethyl-valeronitrile (AMVN).

The polymerization initiator forms a free radical by being dissociated by UV or heat at 30° C. to 100° C. in the battery or by being dissociated by light at room temperature (5° C. to 30° C.), and cross-linking between the monomers having an ethylenically unsaturated group is formed by the free radical polymerization so that a polymer electrolyte may be formed.

Also, the polymerization initiator may be used in an amount of 0.1 part by weight to 10 parts by weight based on 100 parts by weight of the monomer having an ethylenically unsaturated group. In a case in which the polymerization initiator is included in an amount of 10 parts by weight or less, since polymerization rate may be controlled in the polymer electrolyte, a disadvantage that the unreacted polymerization initiator remains and adversely affects the battery performance may be prevented. Furthermore, since the polymerization reaction between the monomers having an ethylenically unsaturated group is smoothly performed if the polymerization initiator is included in an amount of 0.1 part by weight or more, a polymer electrolyte having a uniform thickness may be prepared.

Furthermore, in order to increase a cross-linking reactivity (polymerization reaction effect) of the monomer having an ethylenically unsaturated group, the composition for the polymer electrolyte according to the embodiment of the present invention may further include an oxygen inhibitor capable of inhibiting oxygen generation by reacting with oxygen that interferes with the crosslinking reaction.

As a representative example, the oxygen inhibitor may include tris(2,2,2-trifluoroethyl)phosphite.

The oxygen inhibitor may be included in an amount of 0.1 wt % to 10 wt % based on a total weight of the composition for the polymer electrolyte. In a case in which the oxygen inhibitor is included in the above content ratio, since the oxygen inhibitor may remove an oxygen component by reacting with oxygen which interferes with the cross-linking between compounds, the cross-linking reaction between the monomers having an ethylenically unsaturated group may be more efficiently performed and an effect of preventing a side reaction may be obtained.

Also, a secondary battery according to an embodiment of the present invention may be prepared by forming a polymer electrolyte according to a conventional solution casting method known in the art.

Specifically, in the present invention, a secondary battery including a free-standing solid polymer electrolyte may be prepared by direct coating at least one surface of the prepared negative electrode, positive electrode, and separator with the composition for the polymer electrolyte of the present invention, and then drying and curing the composition for the polymer electrolyte.

Furthermore, the composition for the polymer electrolyte of the present invention may be flow-coated (cast) on a support base, such as a glass substrate and a polyethylene terephthalate (PET), Teflon, or fluorinated ethylene propylene (FEP) film, to form a coating and then dried (organic solvent removal) to be prepared in the form of a film. After the prepared polymer electrolyte film is separated from the support base, a secondary battery may be prepared by disposing the separated polymer electrolyte film on at least one surface of the prepared negative electrode, positive electrode, and separator.

Also, in an embodiment of the present invention, provided is a lithium secondary battery including a positive electrode, a negative electrode, a separator, and a polymer electrolyte formed on at least one surface of the positive electrode, the negative electrode, and the separator, wherein the polymer electrolyte includes the polymer electrolyte of the present invention.

The polymer electrolyte may be a free-standing solid polymer electrolyte.

A thickness of the polymer electrolyte in the form of a film may be in a range of about 0.5 μm to about 300 μm in consideration of the ionic conductivity. In a case in which the thickness of the polymer electrolyte is 0.5 μm or more, the mechanical strength may be secured, and, in a case in which the thickness is 300 μm or less, since a proton ($H^+$), as an ion transporter, may easily pass through the film, an increase in volume for each secondary battery stack is prevented, and thus, a high-performance secondary battery may be prepared.

The lithium secondary battery of the present invention may further include a separator, if necessary.

The positive electrode and the negative electrode constituting the lithium secondary battery of the present invention may be prepared by a conventional method and used.

First, the positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a mixture of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

The positive electrode active material may be included in an amount of 80 wt % to 99 wt % based on a total weight of solid content in the positive electrode slurry.

The binder is a component that assists in the binding between the active material and the conductive agent and in the binding with the current collector, wherein the binder is commonly added in an amount of 1 wt % to 30 wt % based on the total weight of the solid content in the positive electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode active material slurry.

Any conductive agent may be used without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, and thermal black; graphite powder such as natural graphite having a highly developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 50 wt % to 95 wt %, for example, 70 wt % to 90 wt %.

Also, the negative electrode may be prepared by forming a negative electrode material mixture layer on a negative electrode collector. The negative electrode material mixture layer may be formed by coating the negative electrode collector with a negative electrode active material slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material. The negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metals or alloys of lithium and these metals, a metal composite oxide, a material which may be doped and undoped with lithium, and a transition metal oxide.

As the carbon material capable of reversibly intercalating/deintercalating lithium ions, any carbon material may be used without particular limitation so long as it is a carbon-based negative electrode active material generally used in a lithium ion secondary battery, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metals or alloys of lithium and these metals, metals selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn) or alloys of lithium and these metals may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), iron (Fe), Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x \leq 2$), a Si-Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, radium (Ra), scandium (Sc), yttrium (Y), titanium (Ti), zirconium (Zr), hafnium (Hf), vanadium (V), niobium (Nb), tantalum (Ta), dubidium (Db), chromium (Cr), molybdenum (Mo), tungsten (W), seaborgium (Sg), Tc (technetium), rhenium (Re), Bh (bohrium), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (ga), Sn, indium (In), Ge, phosphorus (P), arsenic (As), Sb, bismuth (Bi), sulfur (S), selenium (Se), tellurium (Te), Po (polonium), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode active material slurry.

The binder is a component that assists in the binding between the conductive agent, the active material, and the current collector, wherein the binder is commonly added in an amount of 1 wt % to 30 wt % based on the total weight of the solid content in the negative electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode active material slurry. Any conductive agent may be used without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, and thermal black; graphite powder such as natural graphite having a highly developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as N-methyl-2-pyrrolidone (NMP) and alcohol, and may be used in an amount such that desirable viscosity is obtained when the negative electrode active material as well as selectively the binder and the conductive agent are included. For example, the solvent may be included in an amount such that a concentration of the solid content in the slurry including the negative electrode active material as well as selectively the binder and the conductive agent is in a range of 50 wt % to 95 wt %, for example, 70 wt % to 90 wt %.

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but the lithium secondary battery may be used in various forms, such as a cylindrical type, a prismatic type, a pouch type, or a coin type, depending on the purpose. The lithium secondary battery according to the embodiment of the present invention may be a pouch-type secondary battery.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Electrode Preparation)

A positive electrode active material slurry having a solid content of 90 wt % was prepared by adding 94 parts by weight of a 4.2 V-class $LiCoO_2$ compound as a positive electrode active material, 4 parts by weight of carbon black as a conductive agent, and 2 parts by weight of polyvinylidene fluoride (PVDF), as a binder component, to N-methyl-2-pyrrolidone (NMP) as a solvent.

A surface of a 20 μm thick aluminum (Al) thin film was coated with the positive electrode active material slurry to a thickness of 10 μm and then dried to prepare a positive electrode plate.

A copper (Cu) thin film was coated with lithium metal and then rolled to prepare a 20 μm thick negative electrode plate.

(Polymer Electrolyte Preparation)

100 g of a first polymer including the repeating unit represented by Formula 1a (weight-average molecular weight (Mw)=50,000 g/mol, $n_1$=490), 10 g of vinyl acetate (VAc), and 0.1 g of an UV polymerization initiator (2-hydroxy-2-methylpropiophenone) were added to 1.9 kg of NMP, in which a 1M lithium salt was dissolved, and mixed to prepare a composition for a polymer electrolyte.

After at least one surface of the positive electrode plate was coated with the composition for a polymer electrolyte and dried, UV curing was performed to prepare a solid polymer electrolyte film having a thickness of 50 μm (see Table 1 below).

(Secondary Battery Preparation)

An electrode assembly was prepared by disposing a polyolefin-based separator (thickness: 20 μm) between the prepared negative electrode and positive electrode including the polymer electrolyte, the electrode assembly was accommodated in a pouch-type battery case, and a liquid electrolyte solution, in which 1 M $LiPF_6$ was included in a solvent in which EC and DEC were mixed in a volume ratio of 5:5, was injected thereinto to prepare a 4.2 V-class pouch-type secondary battery (full cell).

Example 2

A polymer electrolyte film and a pouch-type secondary battery including the same were prepared in the same manner as in Example 1 except that methyl methacrylate (MMA) was used instead of the vinyl acetate during the preparation of the polymer electrolyte (see Table 1 below).

Example 3

A polymer electrolyte film and a pouch-type secondary battery including the same were prepared in the same manner as in Example 1 except that 20 g of the vinyl acetate was used during the preparation of the polymer electrolyte (see Table 1 below).

Example 4

A polymer electrolyte film and a pouch-type secondary battery including the same were prepared in the same manner as in Example 1 except that a first polymer including the repeating unit represented by Formula 1b (weight-average molecular weight (Mw)=100,000 g/mol, $n_2$=1,000) was used as the first polymer during the preparation of the polymer electrolyte (see Table 1 below).

Example 5

A polymer electrolyte film and a pouch-type secondary battery including the same were prepared in the same manner as in Example 4 except that 20 g of styrene was used instead of the vinyl acetate during the preparation of the polymer electrolyte (see Table 1 below).

Example 6

A polymer electrolyte film and a pouch-type secondary battery including the same were prepared in the same manner as in Example 1 except that a first polymer including the repeating unit represented by Formula 1c (weight-average molecular weight (Mw)=5,000 g/mol, $n_3$=50) was used as the first polymer and 30 g of vinyl acetate was used during the preparation of the polymer electrolyte (see Table 1 below).

Example 7

A polymer electrolyte film and a pouch-type secondary battery including the same were prepared in the same manner as in Example 1 except that 1 g of tris(2,2,2-trifluoroethyl)phosphite was added as an oxygen inhibitor during the preparation of the polymer electrolyte (see Table 1 below).

Example 8

A polymer electrolyte film and a pouch-type secondary battery including the same were prepared in the same manner as in Example 7 except that a vinyl acetate oligomer (weight-average molecular weight (Mw)=250 g/mol) was used instead of the vinyl acetate monomer during the preparation of the polymer electrolyte (see Table 1 below).

Comparative Example 1

A polymer electrolyte film and a pouch-type secondary battery including the same were prepared in the same manner as in Example 1 except that the vinyl acetate (VAc) was not included during the preparation of the polymer electrolyte (see Table 1 below).

Comparative Example 2

A polymer electrolyte film and a pouch-type secondary battery including the same were prepared in the same manner as in Example 1 except that the first polymer was not included during the preparation of the polymer electrolyte (see Table 1 below).

Comparative Example 3

A polymer electrolyte film and a pouch-type secondary battery including the same were prepared in the same manner as in Example 1 except that linear polyethylene oxide (weight-average molecular weight (Mw)=100,000 g/mol, Aldrich Co.) was included instead of the first polymer during the preparation of the polymer electrolyte (see Table 1 below).

Comparative Example 4

100 g of a first polymer including the repeating unit represented by Formula 1a (weight-average molecular weight (Mw)=50,000 g/mol, $n_1$=490) and 10 g of polyethylene glycol (weight-average molecular weight (Mw)=50,000 g/mol, Aldrich Co.), as a second polymer, were added to 1.9 kg of NMP, in which a 1M lithium salt was dissolved, and mixed to prepare a composition for a polymer electrolyte.

Subsequently, a polymer electrolyte film using the composition for a polymer electrolyte and a pouch-type secondary battery including the same were prepared in the same manner as in Comparative Example 1.

TABLE 2

|  | Oxidation stability (V) @60° C. |
|---|---|
| Example 1 | 5.1 V |
| Example 2 | 5.2 V |
| Example 3 | 8 V or more |
| Example 4 | 5.5 V |
| Example 5 | 6 V or more |
| Example 6 | 6 V or more |
| Example 7 | 5.3 V |
| Example 8 | 6 V or more |
| Comparative Example 1 | 4.8 V |
| Comparative Example 2 | 4.6 V |
| Comparative Example 3 | 4.1 V |
| Comparative Example 4 | 4.4 V |

As illustrated in Table 2, since the secondary batteries prepared in Examples 1 to 8 of the present invention had an oxidation initiation voltage of about 5.1 V or more, it was confirmed that the secondary batteries prepared in Examples 1 to 8 exhibited excellent electrochemical (oxidation) stabilities.

In contrast, with respect to the secondary batteries of Comparative Examples 1 to 4, it may be understood that oxidation initiation voltages were less than about 5.0 V, which was lower than those of the secondary batteries of Examples 1 to 8.

Form these results, it may be confirmed that the oxidation stabilities of the secondary batteries of Examples 1 to 8

TABLE 1

| | First polymer | | | Monomer having an ethylenically unsaturated group for forming a second polymer or oligomer thereof | | Second polymer | | |
|---|---|---|---|---|---|---|---|---|
| | Formula | Molecular weight | Amount (g) | Name | Amount (g) | Name | Amount (g) | Oxygen inhibitor (g) |
| Example 1 | 1a | 50,000 | 100 | VAc | 10 | — | — | — |
| Example 2 | 1a | 50,000 | 100 | MMA | 10 | — | — | — |
| Example 3 | 1a | 50,000 | 100 | VAc | 20 | — | — | — |
| Example 4 | 1b | 100,000 | 100 | VAc | 10 | — | — | — |
| Example 5 | 1b | 100,000 | 100 | Styrene | 20 | — | — | — |
| Example 6 | 1c | 5,000 | 100 | VAc | 30 | — | — | — |
| Example 7 | 1a | 50,000 | 100 | VAc | 10 | — | — | 1 |
| Example 8 | 1a | 50,000 | 100 | VAc Oligomer | 10 | — | — | 1 |
| Comparative Example 1 | 1a | 50,000 | 100 | — | — | — | — | — |
| Comparative Example 2 | — | — | — | VAc | 10 | — | — | — |
| Comparative Example 3 | PEO | 100,000 | 100 | VAc | 10 | — | — | — |
| Comparative Example 4 | 1a | 50,000 | 100 | — | — | Poly(ethylene glycol) | 10 | — |

VAc: vinyl acetate  MMA: methyl methacrylate  PEO: polyethylene oxide

EXPERIMENTAL EXAMPLES

Experimental Example 1. Electrochemical Stability Test

Electrochemical (oxidation) stabilities of the secondary batteries prepared in Examples 1 to 8 and the secondary batteries prepared in Comparative Examples 1 to 4 were measured using linear sweep voltammetry (LSV). A potentiostat (EG&G, model 270A) was used as a measuring device, and measurement temperature was 60° C. The results thereof are presented in Table 2 below.

including the polymer electrolyte of the present invention were improved in comparison to those of the secondary batteries of Comparative Examples 1 to 4.

Experimental Example 2. Tensile Strength Measurement

Specimens were prepared by using the compositions for a polymer electrolyte of Examples 1 to 8 and the compositions for a polymer electrolyte of Comparative Examples 1, 3 and 4, and tensile strengths of these specimens were then measured.

The specimens were collectively prepared according to ASTM standard D638 (Type V specimens), and the tensile strength was measured at a rate of 5 mm per minute at 25° C. and a relative humidity of about 30% using Lloyd LR-10K. The results thereof are presented in Table 3 below.

TABLE 3

|  | Tensile strength (MPa) |
|---|---|
| Example 1 | 8.7 |
| Example 2 | 6.6 |
| Example 3 | 12.4 |
| Example 4 | 9.1 |
| Example 5 | 15.4 |
| Example 6 | 18.0 |
| Example 7 | 9.2 |
| Example 8 | 16.5 |
| Comparative Example 1 | 4.2 |
| Comparative Example 3 | 5.2 |
| Comparative Example 4 | 3.8 |

Referring to Table 3, it may be confirmed that the tensile strengths of the polymer electrolytes prepared in Comparative Examples 1, 3, and 4 were mostly 5.2 MPa or less, but all of the tensile strengths of the polymer electrolytes prepared in Examples 1 to 8 were 6.6 MPa or more. Furthermore, in a case in which the oligomer was used as a compound having an ethylenically unsaturated group for forming a second polymer as in Example 8, it may be understood that the tensile strength was more improved than that of the polymer electrolyte prepared in Example 7 in which the monomer was used.

Thus, it may be understood that mechanical strengths of the polymer electrolytes prepared according to Examples 1 to 8 of the present invention were improved.

Experimental Example 3. Ionic Conductivity Measurement

A circular gold (Au) electrode having a diameter of 1 mm was coated on the polymer electrolyte films prepared in Examples 1 to 8 and the polymer electrolyte films prepared in Comparative Examples 1 to 3 using a sputtering method, and ionic conductivity was then measured according to temperature by using an alternating current impedance method. The ionic conductivity was measured in a frequency range of 0.1 Hz to 100 MHz using a VMP3 measurement instrument and 4294A. The measurement results are presented in Table 4 below.

TABLE 4

|  | Temperature (° C.) | Ionic conductivity (S/cm) |
|---|---|---|
| Example 1 | 25 | $1.5 \times 10^{-4}$ |
| Example 2 | 25 | $1.2 \times 10^{-4}$ |
| Example 3 | 25 | $9.1 \times 10^{-5}$ |
| Example 4 | 25 | $8.5 \times 10^{-5}$ |
| Example 5 | 25 | $4.6 \times 10^{-5}$ |
| Example 6 | 25 | $3.8 \times 10^{-5}$ |
| Example 7 | 25 | $2.2 \times 10^{-4}$ |
| Example 8 | 25 | $2.0 \times 10^{-4}$ |
| Comparative Example 1 | 25 | $1.5 \times 10^{-4}$ |
| Comparative Example 2 | 25 | $1.6 \times 10^{-5}$ |
| Comparative Example 3 | 25 | $2.8 \times 10^{-5}$ |

Referring to Table 4, it may be understood that ionic conductivities of the polymer electrolytes prepared in Examples 1, 7, and 8 were improved in comparison to those of the polymer electrolytes of Comparative Examples 2 and 3.

With respect to the polymer electrolyte of Comparative Example 1, it may be understood that, since it included the polymer network composed of only the first polymer, ionic conductivity was somewhat higher than those of the polymer electrolytes prepared in Examples 2 to 6.

However, as described above, since the polymer electrolyte of Comparative Example 1 included the polymer network composed of only the first polymer, it may be understood that the electrochemical stability and tensile strength were reduced in comparison to those of the polymer electrolytes prepared in Examples 2 to 6.

The above descriptions are merely exemplary embodiments for implementing the polymer electrolyte according to the present invention, the preparation method thereof, and the secondary battery including the polymer electrolyte, so that the present invention is not limited thereto. The true scope of the present invention should be defined to the extent that those skilled in the art can make various modifications and changes thereto without departing from the scope of the invention, as defined by the appended claims.

The invention claimed is:

1. A polymer electrolyte for a secondary battery, the polymer electrolyte comprising:
    a first polymer matrix of a first polymer, wherein the first polymer comprises at least one repeating unit represented by Formulae 1a or 1c; and
    a second polymer matrix of a second polymer, wherein the second polymer comprises a repeating unit derived from a monomer having at least one ethylenically unsaturated group or an oligomer thereof,
    wherein the second polymer has a crosslinking structure obtained by cross-linking polymerization of the monomer having the at least one ethylenically unsaturated group or oligomer thereof,
    wherein the second polymer matrix is in the form of a polymer network structure,
    wherein the second polymer matrix is disposed in free volumes of the first polymer matrix, and
    wherein the second polymer is poly(vinyl acetate),

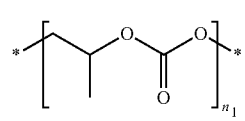

[Formula 1a]

wherein, in Formula 1a, $n_1$ is an integer of 10 to 10,000, and

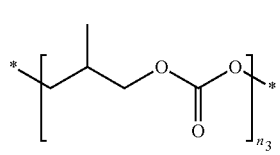

[Formula 1c]

wherein, in Formula 1c, $n_3$ is an integer of 10 to 10,000.

2. The polymer electrolyte for a secondary battery of claim 1, wherein the second polymer is included in an amount of 10 part by weight to 30 parts by weight based on 100 parts by weight of the first polymer.

3. The polymer electrolyte for a secondary battery of claim 1, further comprising a lithium salt.

4. The polymer electrolyte for a secondary battery of claim 3, wherein the lithium salt is included in a concentration of 0.5 M to 5 M in the polymer electrolyte.

5. The polymer electrolyte for a secondary battery of claim 1, wherein the polymer electrolyte is a free-standing solid polymer electrolyte.

6. A lithium secondary battery comprising:
   a positive electrode;
   a negative electrode; and
   a polymer electrolyte film formed on at least one surface of the positive electrode or the negative electrode,
   wherein the polymer electrolyte film comprises the polymer electrolyte of claim 1.

7. A composition for forming the polymer electrolyte of claim 1, the composition comprising:
   the first polymer including a repeating unit represented by Formula 1a or 1c;
   the monomer having at least one ethylenically unsaturated group or an oligomer thereof;
   an organic solvent;
   a lithium salt; and
   a polymerization initiator configured to dissociate to form a free radical which facilitates cross-linking between the monomer having at least one ethylenically unsaturated group to provide the second polymer so that the polymer electrolyte is formed,
   wherein the monomer having an ethylenically unsaturated group comprises vinyl acetate.

8. The composition for the polymer electrolyte of claim 7, wherein the first polymer is included in an amount of 50 wt % to 95 wt % based on a total weight of reactants including the first polymer, the monomer having an ethylenically unsaturated group, and the polymerization initiator in the composition for the polymer electrolyte.

9. The composition for the polymer electrolyte of claim 7, wherein the monomer having an ethylenically unsaturated group or the oligomer thereof is included in an amount of 10 part by weight to 30 parts by weight based on 100 parts by weight of the first polymer.

10. The composition for the polymer electrolyte of claim 7, further comprising an oxygen inhibitor.

11. The composition for the polymer electrolyte of claim 10, wherein the oxygen inhibitor is included in an amount of 0.1 wt % to 10 wt % based on a total weight of the composition.

12. A method of preparing a secondary battery, the method comprising:
   coating the composition for the polymer electrolyte of claim 7 on at least one surface of a negative electrode, a positive electrode, or a separator; and
   drying and curing the coated composition to form a polymer electrolyte film.

13. A method of preparing a secondary battery, the method comprising:
   coating the composition for the polymer electrolyte of claim 7 on a base;
   drying the composition to form a polymer electrolyte film;
   separating the polymer electrolyte film from the base; and
   disposing the separated polymer electrolyte film on at least one surface of a negative electrode, a positive electrode, or a separator.

* * * * *